June 13, 1944.

J. W. OVERBEKE 2,351,284

AIRCRAFT CONSTRUCTION

Filed May 29, 1940

Inventor
John William Overbeke

By Harrison Sates
Attorney

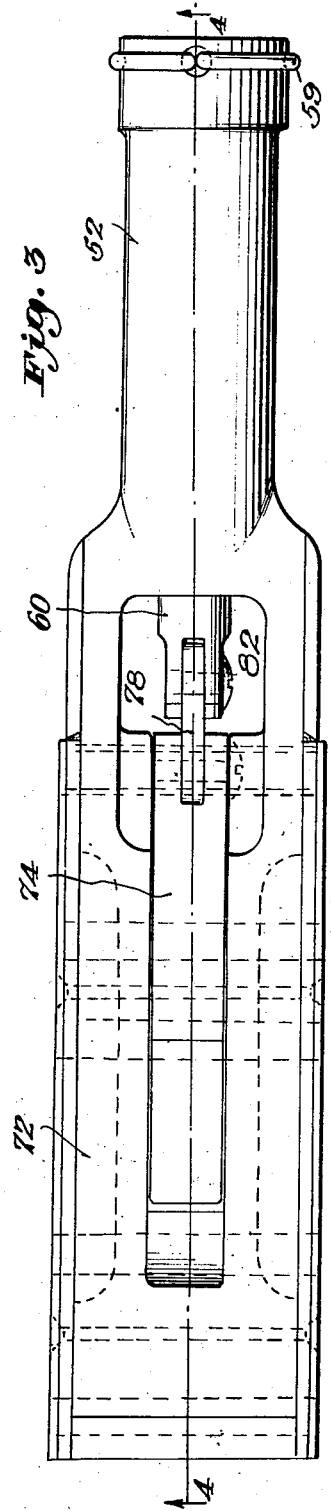
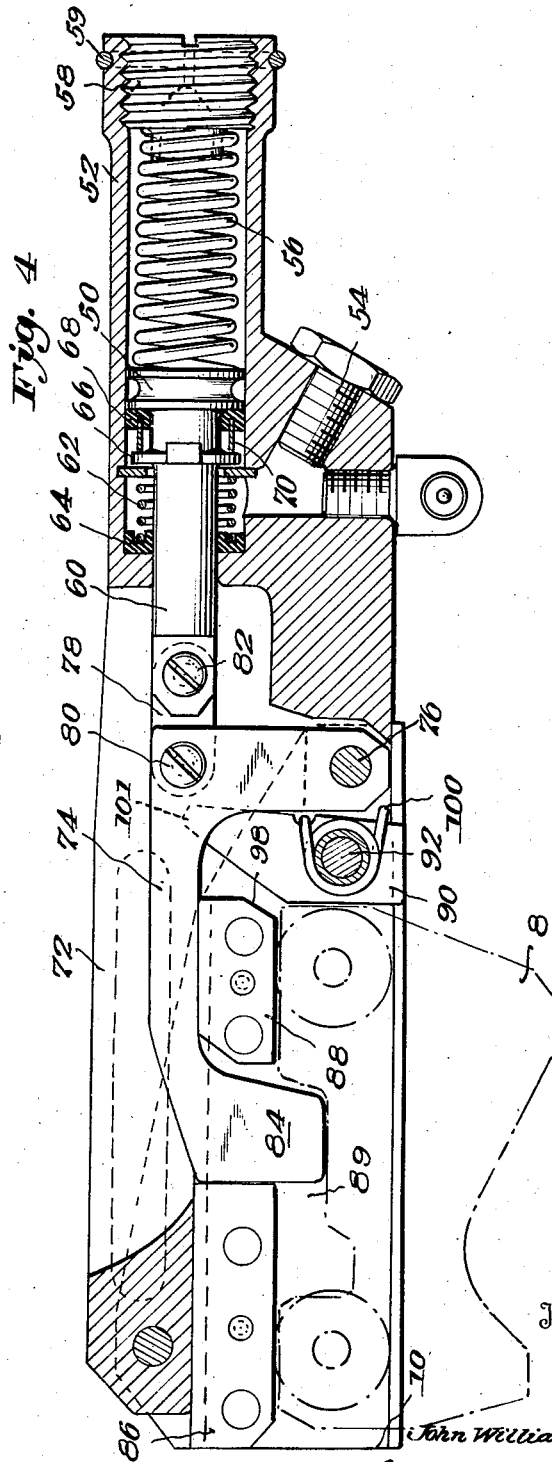

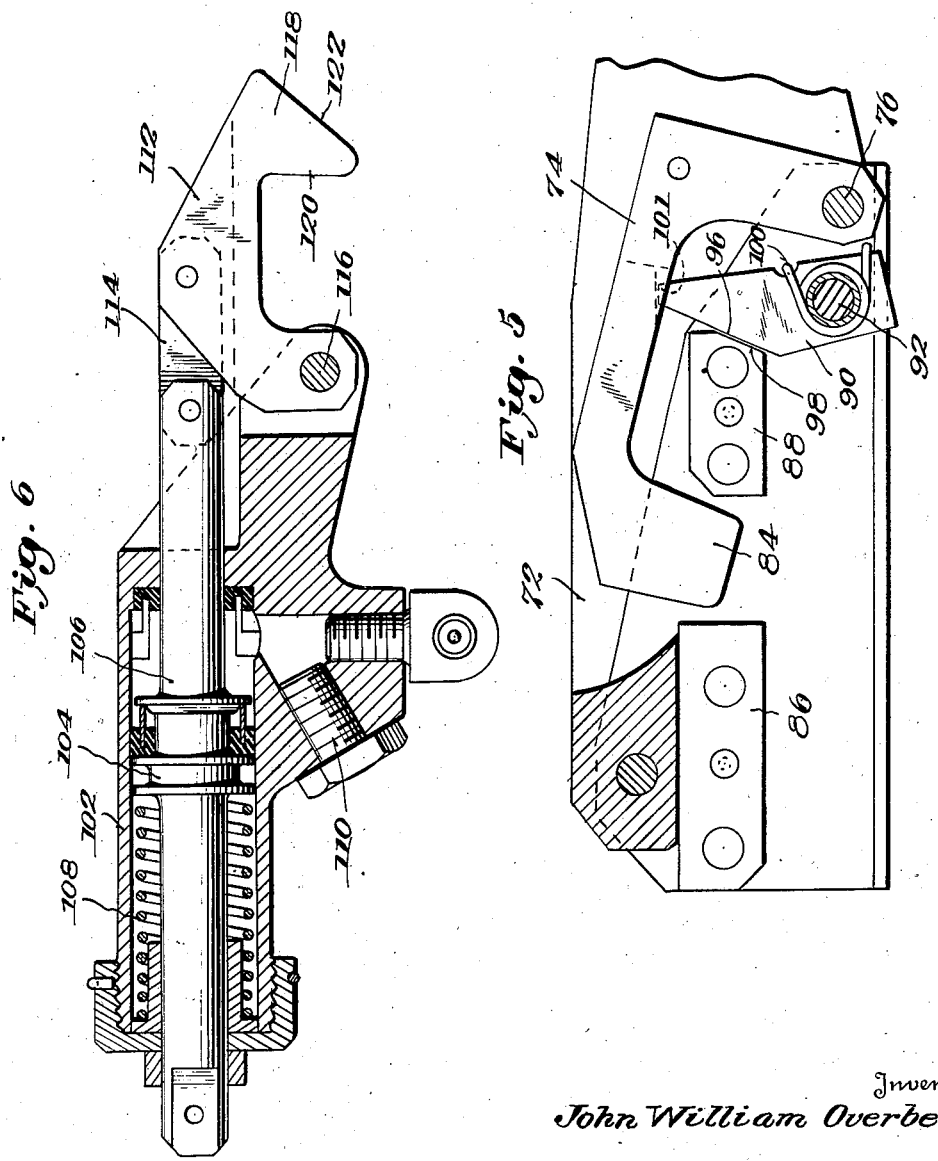
June 13, 1944.  J. W. OVERBEKE  2,351,284
AIRCRAFT CONSTRUCTION
Filed May 29, 1940  5 Sheets-Sheet 3
Inventor
John William Overbeke,
By [signature]
Attorney June 13, 1944.  J. W. OVERBEKE  2,351,284
AIRCRAFT CONSTRUCTION
Filed May 29, 1940  5 Sheets-Sheet 4
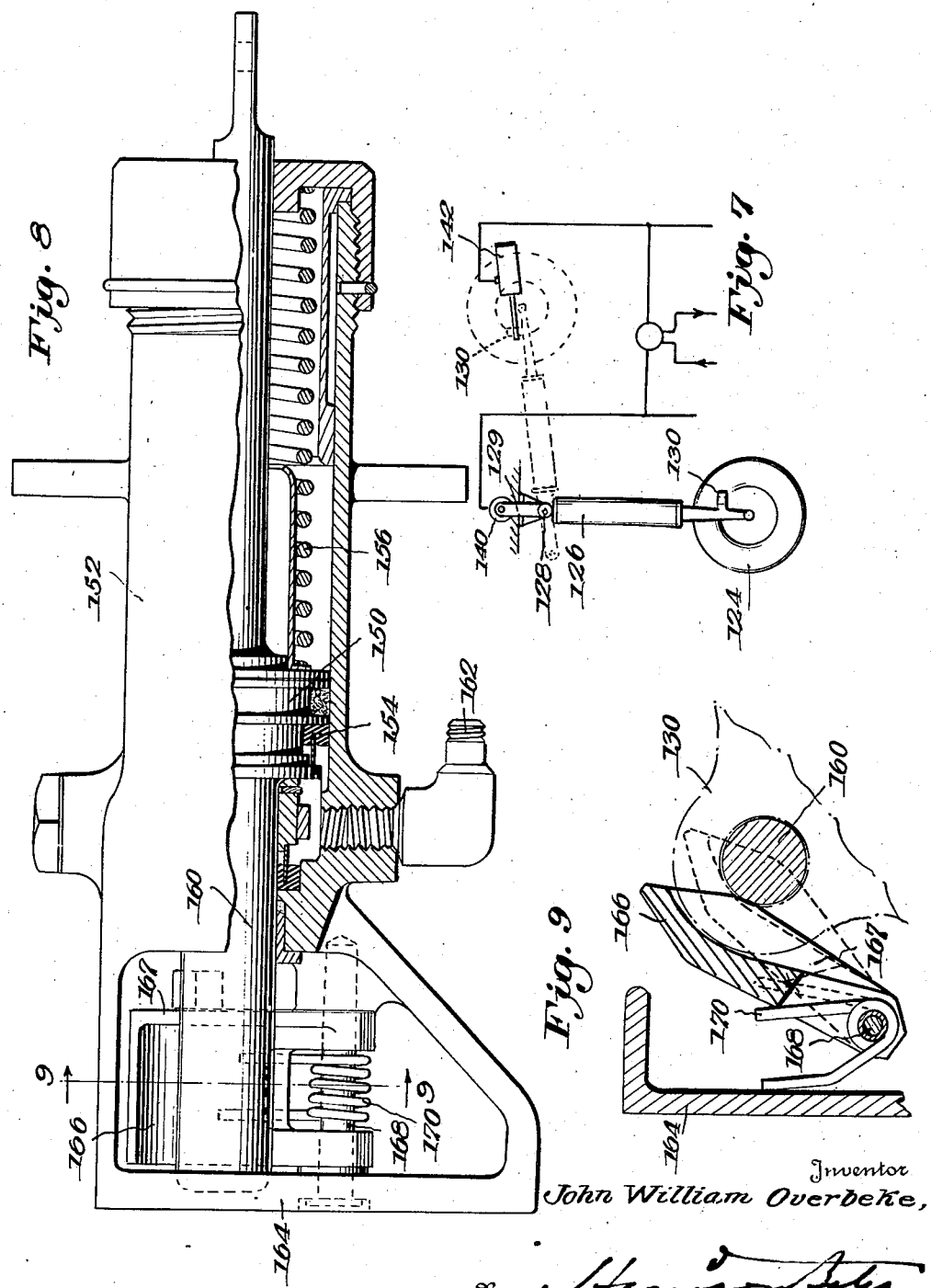
Inventor
John William Overbeke,
By [signature]
Attorney

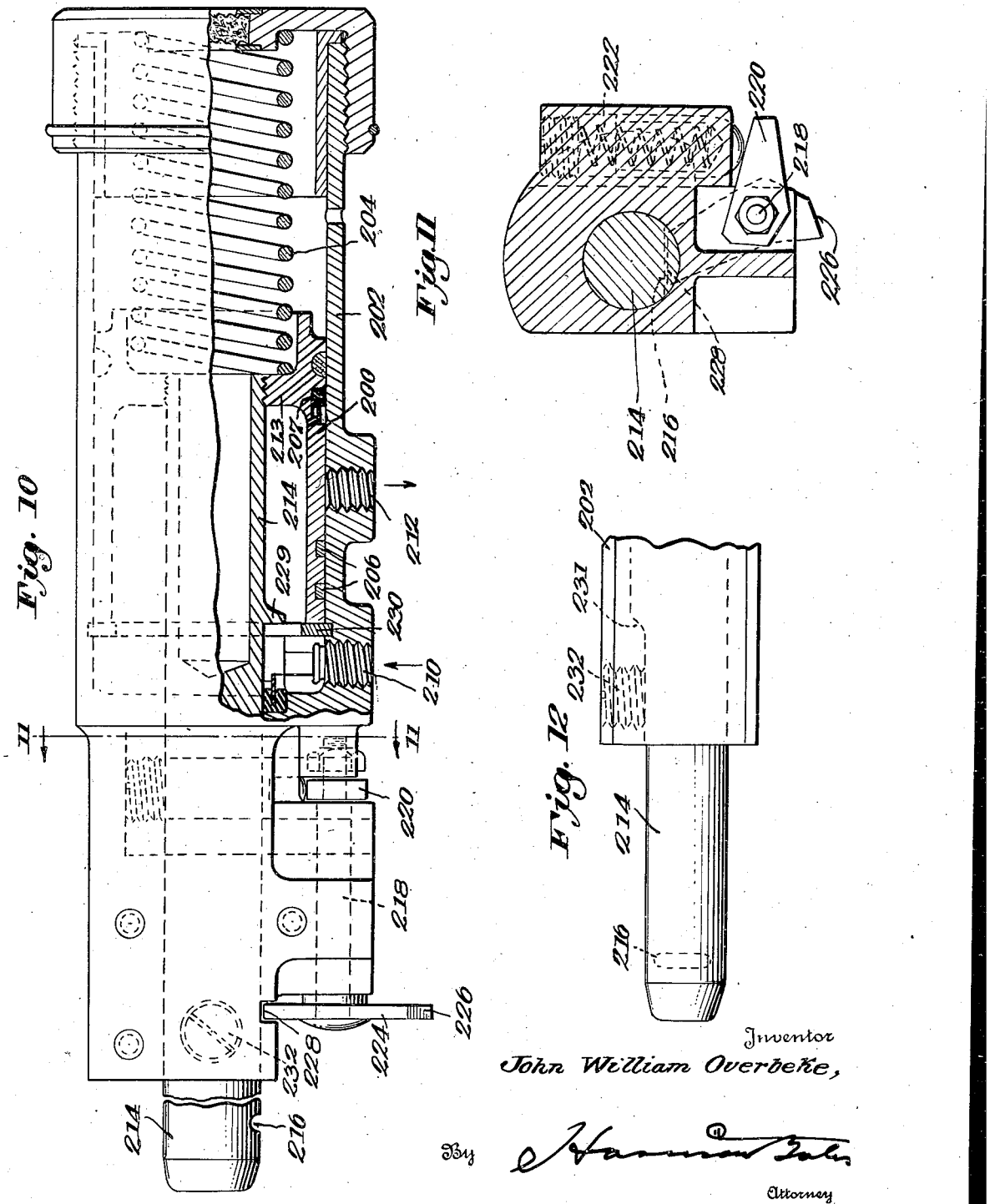

Patented June 13, 1944

2,351,284

UNITED STATES PATENT OFFICE 2,351,284

AIRCRAFT CONSTRUCTION

John W. Overbeke, Anneslie, Md., assignor to The Glenn L. Martin Company, Baltimore, Md.

Application May 29, 1940, Serial No. 337,818

4 Claims. (Cl. 244—102)

This invention is directed to the construction of means for locking landing gear for aircraft in either the up retracted position, or the down landing position.

In retractable landing gear for aircraft, it is customary to provide some means for locking the landing gear in either up (retracted) position, or down (landing) position. This is to prevent the landing gear from unexpectedly moving from either one or the other of these positions. In the provision of such locking means it is desirable to have a locking system which is simple of operation, dependable, and of positive action. It is also desirable to have the action of the locking mechanism which, through failure, does not prevent the landing gear from being moved to final position.

It is an object of this invention to provide a hydraulically controlled system for the locking of the landing gear of an aircraft in either up or down position.

Another object of the invention is to provide a hydraulically controlled locking mechanism, the operation of which is in part dependent upon the movement of the landing gear so that the landing gear is always movable to final position.

Another object of the invention is to provide novel locking connections between the landing gear and the locking mechanism.

Generally these objects of the invention are obtained by providing a hydraulically operated lock in connection with a novel hydraulic system which is connected either in parallel or in series with the hydraulically operated mechanism for raising or lowering the landing gear.

The locking mechanism is such that a part of the operation thereof, for unlocking, is dependent upon the hydraulic power provided from the hydraulic system, while the locking function is obtained by contact of the landing gear with the locking mechanism. The apparatus may have the form in which a trolley portion of the retracting mechanism rides along a track and is engaged by locks at either end of the track corresponding to the up and down positions of the gear, or the invention may be in the form of a locking mechanism which engages with a portion of the landing gear strut when the strut is moved to either the up or down position of the landing gear.

The means by which the objects of this invention may be obtained are more fully described in the accompanying drawings which form a part hereof. In the drawings:

Fig. 3 is a plan view of one form of locking mechanism which can be used in Fig. 1 as illustrated on the right-hand side thereof.

Fig. 4 is a sectional view on the line 4—4 of Fig. 3.

Fig. 5 is an enlarged detail of the form of lock shown in Figs. 3 and 4, in inoperative position.

Fig. 6 is a modified form of the locking mechanism usable as shown on the left-hand side of Fig. 1.

Fig. 7 is a diagrammatic view showing a strut lock mechanism.

Fig. 8 is a side elevational view, partly in section, of the form of lock used with the mechanism of Fig. 7.

Fig. 9 is a sectional view on the line 9—9 of Fig. 8.

Fig. 10 is a side elevational view, partly in section, of a modified locking mechanism of the strut lock type.

Fig. 11 is a cross-sectional view on the line 11—11, Fig. 10.

Fig. 12 is a plan view of a detail of Fig. 10.

Figure 1:
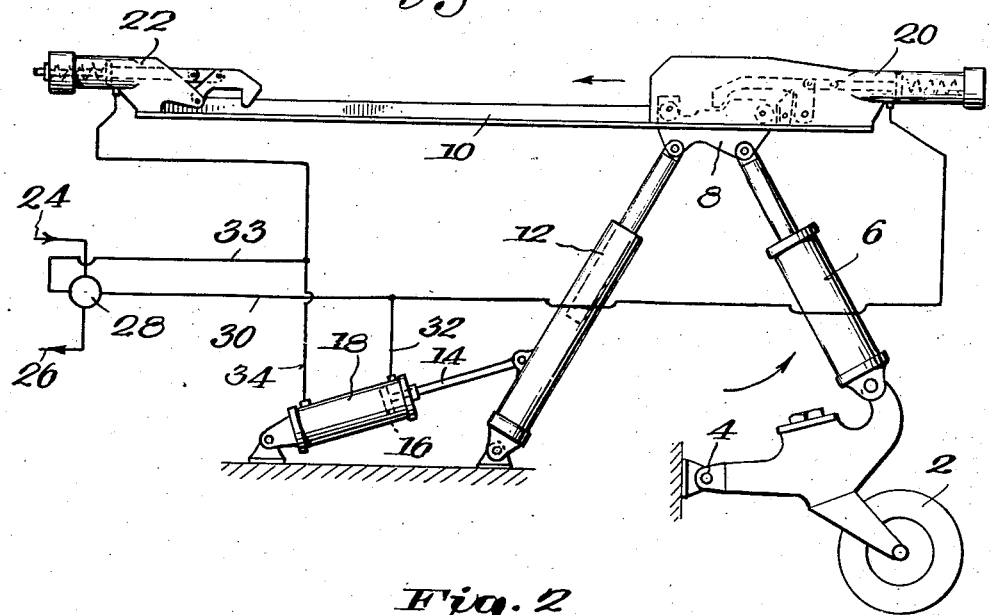
Fig. 1 is a diagrammatic view of a locking system in which a hydraulic system connects the locking members in parallel with the retracting mechanism.
Figure 2:
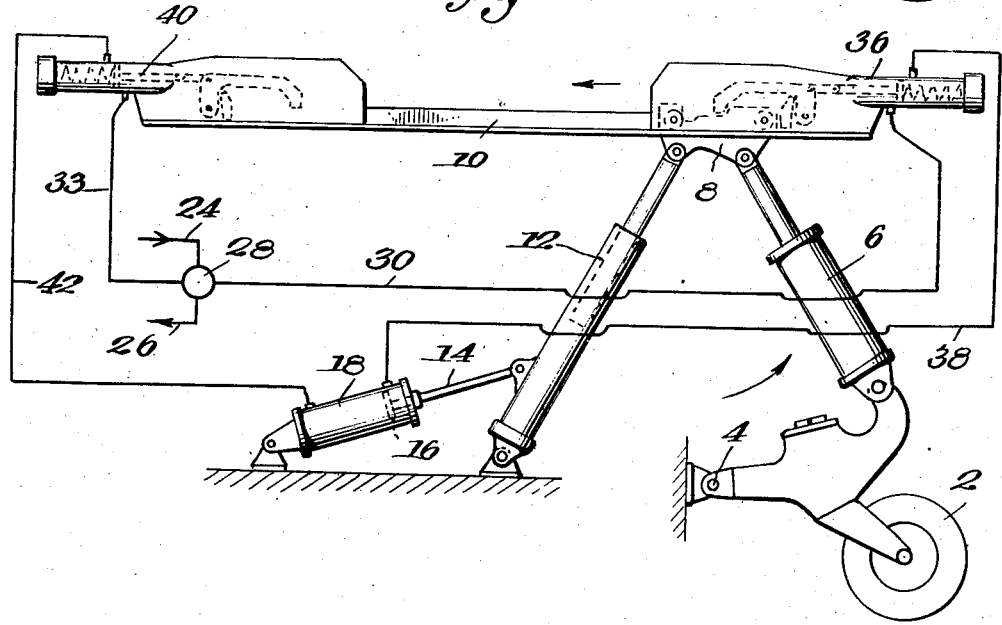
Fig. 2 is a similar view, but showing the locking mechanism and retracting mechanism connected in series.

Figs. 1 and 2 illustrate the two different types of hydraulic systems which can be used to operate the locking mechanisms of this invention. The illustration is with respect to the so-called trolley locking mechanisms of Figs. 3 to 6, but it is understood that the same systems can be used with the so-called strut type locking mechanisms illustrated in Figs. 7 to 12, inclusive. In Fig. 1, the hydraulic retracting gear and the hydraulic locking gear are shown connected in parallel with a hydraulic pressure line. Landing wheel 2 is rotatable about the axis 4 through movement of the strut 6. This strut is connected at its upper end to a trolley 8 movably mounted upon track 10. Trolley 8 is also connected to a driving arm 12, which arm is operated by a connecting rod 14 joined to a piston 16 mounted within a hydraulic cylinder 18. At one end of the track 10 is a hydraulically operated locking mechanism 20, and at the other end of track 10 is a second hydraulically operated locking mechanism 22. These mechanisms will be later specifically described, it being sufficient to say for the present that each comprises a cylinder having a hydraulically operated piston therein. The hydraulic system for operating the locking mechanisms comprises hydraulic supply and return lines 24 and 26 which connect a fluid pump to a valve 28, from which line 30 leads to hydraulic lock 20. Line 30 is further connected through line 32 to one end of cylinder 18. Valve 28 is likewise connected to lock 22 through line 33, and line 33 is further joined to the other end of cylinder 18 by line 34.

This system operates as follows: When it is desired to raise the wheel 2 from the down position shown, into the retracted position, valve 28 is turned so that fluid pressure flows through line 30. This fluid pressure enters the hydraulic mechanism 20 and causes the lock to be released or opened. At the same time, the pressure has entered cylinder 18 through line 32 and as soon as the lock has been released, the pressure in cylinder 18 moves piston 16, which in turn causes arm 12 to be pulled to the left, thus moving trolley 8 along track 10 and causing strut 6 to lift wheel 2 in a rotating movement about pivot 4. Trolley 8 moves across track 10 until the trolley 8 is engaged by the locking mechanism 22.

When it is desired to lower wheel 2, the valve 28 is turned so that pressure flows through line 33 into the hydraulic lock 22, thereby releasing the lock. At the same time, fluid under pressure enters cylinder 18 through line 34, thus causing piston 16 to be moved to the right, and moving trolley 8 to the right to lower wheel 2.

A series system for operating the trolley lock mechanism is shown in Fig. 2. Therein the wheel 2 is joined to strut 6 and trolley 8, and the trolley is connected through arm 12 to piston 16 as in Fig. 1. The locking mechanisms are, however, of a different construction. Thus, each lock comprises a cylinder having a piston movable under fluid pressure therein, which piston is movable to uncover an exhaust port, and thereby establishes communication between the intake and exhaust ports through the cylinder. Such a cylinder is shown for example in Fig. 10, and it is to be understood that the cylinder can be used in either the trolley lock or strut lock mechanisms. Fluid pressure is again supplied through lines 24, 26 to valve 28, and through line 30 to locking mechanism 36. This fluid pressure will move the piston to the right, thus releasing the lock upon the trolley 8, and the piston moves until an exhaust port is uncovered to establish communication between line 30 and line 38. Line 38 is joined to one end of cylinder 18, and the fluid pressure flowing through lock 36 actuates piston 16 after the lock has been released. Piston 16 functions as in Fig. 1 to move the trolley to the left until it engages lock 40. In the reverse operation, fluid pressure is communicated to lock 40 through line 33 from valve 28, and the piston in lock 40 moves to the left to release the locking mechanism and to establish communication between the inlet line 33 and the exhaust line 42. Line 42 is joined to the opposite end of cylinder 18, and fluid pressure entering the cylinder from line 42 moves the piston 16 to cause the trolley 8 to travel to the right. It is noted that a trigger lock mechanism, to be later described, holds each lock open until locking takes place, and thus a reverse movement of operating fluid can take place through each cylinder.

The construction of the locking mechanism 20 is specifically illustrated and described in Figs. 3 and 4. A piston 50 is housed within cylinder 52, this cylinder being connected through passage 54 with a source of fluid pressure such as the line 30 in Fig. 1.

Piston 50 is urged toward one end of cylinder 52 by spring 56, which bears against a nut 58 closing one end of the cylinder and locked thereto by wire 59. The other face of piston 50 has a connecting rod 60 extending therefrom. Packing 64 surrounding connecting rod 60 at the left-hand side of the cylinder is held in place by means of a spring 62, the other end of which rests against a flange washer 66 mounted in the cylinder wall. Packing material 68 provides a fluid seal between the face of piston 50 and the cylinder wall, this packing being held in place by a spring metal retaining ring 70 resting against shoulder 66.

Cylinder 52 is extended to form a housing 72 for the locking lug. This housing is adapted to overlie track 10 and to receive the trolley 8. The locking lug comprises a trigger 74 in the form of a bell crank which has one end pivotally secured to housing 72 and 76. The bight of the crank is pivotally connected to a link 78 at 80, the other end of the link being pivotally joined to the end of rod 60 at 82. The free end 84 of trigger 74 is movable between abutments 86 and 88 upon housing 72, and beneath which trolley 8 slides. The upper surface of the trolley, indicated in dot-dash lines in Fig. 4, has a notch 89 adapted to receive end 84 of trigger 74.

A catch for latching trigger 74 in non-locking position, is provided by means of an arm 90 pivotally mounted at 92 upon housing 72. Arm 90 is normally urged by spring 100 to a position to the left so that its edge 96 abuts against an oblique edge 98 on plate 88, note Fig. 5. In this position the upper end 101 of arm 90 engages within a recess on the under surface of trigger 74 and holds trigger 74 so that the end 84 cannot move downwardly. However, when arm 90 is struck by trolley 8, as indicated in Fig. 4, the arm is rotated to the right against the pressure of spring 100, and end 101 is moved back into a recess in trigger 74 so that end 84 of the trigger can fall downwardly into locking engagement with the trolley. The operation of this device when fluid pressure is applied through bore 54 is as follows:

Piston 50 is moved to the right against the pressure of spring 56, this movement causing connecting rod 60 to pull link 78 and trigger 74 in a clockwise rotation. End 84 of trigger 74 is raised, thus releasing the trolley. At the same time, the pressure of spring 100 causes arm 90 to rotate in a counter-clockwise direction, bringing it from the position shown in Fig. 4 to that shown in Fig. 5, so that the catch holds the trigger in upright position. This means that the trigger cannot be lowered until arm 90 has been shifted by trolley 8, when the trolley is returned to its original position. In other words, the trigger 74 cannot fall to its locking position without the presence of the trolley 8, so that the trolley can always be returned to its final position corresponding either to the fully retracted or to the fully extended position of the landing wheels. By these means a portion of the operation of the hydraulic locking mechanism is dependent upon the function of the trolley. When the trolley engages blade 90, the trigger 74 is automatically moved to locking position through the action of spring 56 against piston 50.

When this mechanism is used in the series circuit of Fig. 2, and includes the special cylinder of the type shown in Fig. 10, the catch keeps the piston in the cylinder in retracted position so that communication between the inlet and exhaust ports exists through the cylinder until the catch is released by the trolley. Consequently, fluid forced into the cylinder from cylinder 18, Fig. 2, will freely pass therethrough.

A simplified form of construction is shown in Fig. 6 wherein the construction of the piston and connecting rods is substantially similar to that shown in Fig. 4. Mounted within cylinder 102 is a piston 104, to one end of which is joined a connecting rod 106. Piston 104 is urged toward the right by spring 108. Fluid is passed into cylinder 102 through bore 110. Connecting rod 106 is joined to a trigger 112 through a link 114. Trigger 112 is substantially chevron-shaped with one free end thereof pivotally mounted at 116 to the cylinder housing, the bight of the chevron being pivotally connected to link 114. The free end of the trigger 112 is substantially triangular in shape with a vertical edge 120 and an inclined edge 122. Inclined edge 122 presents a cam surface when struck by the trolley 8, and under the cam action, trigger 112 is raised in order to allow the trolley to move to locked position. The trigger is lowered through action of spring 108 against piston 104. Otherwise, this unit functions according to the description given for the operation of Figs. 1 and 4.

The parallel or series connected hydraulic systems shown in Figs. 1 and 2, respectively, can be adapted to operate the so-called strut-type locking mechanisms illustrated in Figs. 7 to 12, inclusive. In Fig. 7, a wheel 124 depends from strut 126, which is pivotally secured at 128 to the aircraft. Strut 126 is provided with an arm 129 at the upper end thereof and a lug 130 adjacent wheel 124, each having a hole therethrough which is adapted to receive a pin from a hydraulically operated locking mechanism so that the strut can be locked in lowered position by means of arm 129 as illustrated in full lines of Fig. 7, or locked in up or retracted position through lug 130 as illustrated in dotted lines in Fig. 7. For purposes of example, locking mechanisms 140 for the down position, and 142 for the up position, are indicated as being connected in parallel, as in Fig. 1, to the retracting mechanism. The type of hydraulically operated locking mechanisms 140, 142 which may be used, is more fully illustrated in Figs. 8 to 10, inclusive.

In Fig. 8, a piston 150 is housed in cylinder 152, this piston being provided with packing 154, and being urged to the left by spring 156. To the other face of the piston is joined a locking pin 160. Fluid pressure is provided through fitting 162, as from line 30, Fig. 1. Cylinder 152 is provided with a housing 164 into which in the arm 129 or lug 130 is adapted to enter and to be engaged by pin 160. A trigger 166 having a flange 167 is pivotally mounted upon a pin 168 within this housing and is urged by means of spring 170 to a position which would normally prevent the end of pin 160 from entering the housing 164, flange 167 being adapted to close off the path of pin 160 (dotted line position Fig. 9). As shown more clearly in Fig. 9, when strut 126 is moved, either the lug 130 or arm 129 enters into housing 164 in either the up or down positions, respectively, of the landing gear as the case may be, the lug or arm engages trigger 166 and moves flange 167 out of the way so that pin 160 can enter into the hole provided, thus locking the lug or arm in position. In reverse operation, removal of the pin allows the strut to be moved, and the trigger 166 drops flange 167 over the end of pin 160 so that the pin cannot enter into the space within the housing until trigger 166 has again been pushed out of the way by lug or arm.

A hydraulically operated locking device adapted to work with the series system shown in Fig. 2, but for the strut locking mechanism shown in Fig. 7, is illustrated in Figs. 10 to 12. The cylinder construction of this figure can be substituted for the cylinders of Figs. 1 to 5 in order to adapt them to series operation.

In Fig. 10, the hollowed-out piston 200 is housed within cylinder 202, the piston being urged to the left through the pressure of spring 204 and being provided with metal rings 206 and packing 207. Fluid pressure is provided to the cylinder through intake port 210. An exhaust port is provided at 212. It is noted that the stroke of the piston is such that in its movement to the right it uncovers exhaust port 212, so that communication is established through the cylinder between intake port 210 and exhaust port 212, this allowing the establishment of the connection between lines 30 and 38 of Fig. 2. Secured to the bottom 213 of piston 200 is a locking pin 214. This pin is adapted to engage an arm or lug such as shown in Fig. 7.

Pin 214 is provided with a recess 216. A shaft 218 is rotatably journalled to the cylinder housing parallel to pin 214. One end of shaft 218 is provided with a crank 220 which is urged downwardly by means of a spring 222 set in a bore in the cylinder housing. The other end of the pin 218 carries a blade 224 having a cam edge 226 at one end and a locking edge 228 at the other end. When the piston 200 is moved to the right under the force of fluid pressure, the pin 214 is moved so that the recess 216 comes opposite the end 228 of blade 224. Under the action of spring 222, the blade engages recess 216 and thus holds the pin 214 in retracted position. When the arm or lug, Fig. 7, is to be locked to pin 214, the strut engages cam surface 226 to rotate blade 224 and thus release the pin 214, which, under the pressure of spring 204, is moved into locking engagement with the arm or lug. Forward movement of pin 214 is limited by engagement of the left-hand edge of piston 200 with a stop plate 230 mounted on the interior wall of cylinder 202. As shown in Fig. 12, pin 214 is also provided with a flat surface which is adapted to be contacted by a set screw 232 in order to prevent rotation under the action of spring 204 which otherwise might turn recess 216 away from blade 224.

According to all of the forms of the invention, some means is provided in conjunction with the locking mechanism so that the locking mechanism cannot prevent the landing gear from being moved to the fully extended or fully retracted position. Locking takes place automatically when the gear reaches the limit of its movement.

Having now described a means by which the objects of the invention may be obtained, what I claim as new and desire to secure by Letters Patent is:

1. In combination with a retractable landing gear for aircraft including a trolley movable along a track into engagement with a locking mechanism, said mechanism comprising a housing adapted to receive said trolley, trigger means mounted within said housing for locking engagement with said trolley, means for operating said trigger means, and spring biased latch means actuatable by movement of said trolley for releasing said trigger from a latched non-locking position for movement into locking engagement with said trolley.

2. In a landing gear, a down lock, interconnected hydraulic systems for retracting said landing gear and said down lock, said lock comprising a housing forming an abutment for a portion of a landing gear, a spring motor actuated pin mounted within said housing and adapted to engage said landing gear portion, said spring motor comprising a spring, a pin, a piston member connected to said pin and said spring, said piston member forming a part of the hydraulic system for moving said pin out of engagement with said landing gear portion against a force exerted on said pin by said spring, and a trigger mechanism for holding the pin in the non-engaging position, said trigger being actuated by said landing gear portion to release said pin when said landing gear portion is aligned with said housing to receive said pin.

3. In a landing gear, a down lock, interconnected hydraulic systems for retracting said landing gear and said down lock, said lock comprising a housing adapted to receive a portion of a landing gear, a spring motor actuated latch pivotally connected to said housing and adapted to engage said landing gear portion, said spring motor comprising a hydraulic cylinder adjacent said housing and connected with a landing gear retracting mechanism, a piston member in said cylinder for moving said latch out of engagement with said landing gear portion, a connecting rod pivotally joining said piston, through an intermediate link, to said latch, a spring in said cylinder for moving said latch into engagement with said landing gear portion through said connecting rod and intermediate link, and a trigger mechanism being cocked when said piston retracts said latch from engagement with said landing gear portion, said trigger mechanism being actuated by said landing gear portion to release said latch when said landing gear portion is in proper alignment within said housing to receive said latch.

4. In combination with a retractable landing gear for aircraft including a landing gear strut, a locking lug on said strut and a locking mechanism for locking engagement with said lug, said mechanism comprising a housing adapted to receive said lug, a pin mounted within said housing and forming a part of said locking mechanism for locking engagement with said lug, means for operating said pin, and latch means actuatable by movement of said lug for releasing said pin from a latched non-engaging position for movement into locking engagement with said lug.

JOHN W. OVERBEKE.